United States Patent [19]
Tesh et al.

[11] Patent Number: 5,096,353
[45] Date of Patent: Mar. 17, 1992

[54] VISION SYSTEM FOR A ROBOTIC STATION

[75] Inventors: Mark A. Tesh, Sunrise; Keith D. Soldner, Coral Springs; Sandor Kalman, Lighthouse Point, all of Fla.

[73] Assignee: Motorola, Inc., Schaumburg, Ill.

[21] Appl. No.: 558,380

[22] Filed: Jul. 27, 1990

[51] Int. Cl.⁵ ............................................. B25J 9/06
[52] U.S. Cl. ......................................... 414/225; 901/47; 356/254; 358/101; 359/857
[58] Field of Search ............... 358/101, 106; 356/254, 356/255; 350/617, 618; 414/730, 751, 729, 680, 744.1, 749, 225; 901/47, 46, 42, 7; 29/759

[56] References Cited

U.S. PATENT DOCUMENTS

| | | | |
|---|---|---|---|
| 2,854,887 | 10/1958 | Lankes | 350/618 X |
| 3,007,097 | 10/1961 | Shelley et al. | 901/47 X |
| 3,622,232 | 11/1971 | Munnerlyn | 350/618 |
| 3,684,380 | 8/1972 | Benchley, Jr. | 356/254 X |
| 4,187,051 | 2/1980 | Kirsch et al. | 901/47 X |
| 4,291,334 | 9/1981 | Mese et al. | 358/101 |
| 4,340,271 | 7/1982 | Robinson et al. | 356/254 X |
| 4,380,696 | 4/1983 | Masaki | 901/49 X |
| 4,394,683 | 7/1983 | Liptay-Wagner et al. | 901/47 X |
| 4,437,114 | 3/1984 | LaRussa | 358/101 |
| 4,542,279 | 9/1985 | Case, Jr. et al. | 901/47 X |
| 4,596,037 | 6/1986 | Bouchard et al. | 358/101 X |
| 4,663,698 | 5/1987 | Tomlinson | 350/618 X |
| 4,675,502 | 6/1987 | Haefner et al. | 901/47 X |
| 4,692,690 | 9/1987 | Hara et al. | 358/101 X |
| 4,727,471 | 2/1988 | Driels et al. | 901/47 X |
| 4,738,025 | 4/1988 | Arnold | 901/47 X |
| 4,782,751 | 11/1988 | Colapinto | 350/618 X |
| 4,794,648 | 12/1988 | Ayata et al. | 358/101 X |
| 4,796,200 | 1/1989 | Pryor | 901/47 X |
| 4,929,893 | 5/1990 | Sato et al. | 358/101 X |
| 4,973,216 | 11/1990 | Domm | 901/47 X |

FOREIGN PATENT DOCUMENTS 0159401  12/1980  Japan .................................. 350/618

OTHER PUBLICATIONS

IBM Technical Disclosure Bulletin, "TV Camera Periscope to Eliminate RF Interference", vol. 28, No. 2, Jul. 1985, p. 619.

*Primary Examiner*—Frank E. Werner
*Assistant Examiner*—James Eller
*Attorney, Agent, or Firm*—Robert S. Babayi

[57] ABSTRACT

A vision system for a robotic station which includes a camera for locating an object to be placed. The camera is mounted to a robotic manipulator which includes a gripper for holding the object. A mirror assembly deflects the images of the object such that it is captured by the camera. The mirror assembly comprises two face-to-face mirrors being angled at 45 degrees.

2 Claims, 1 Drawing Sheet

VISION SYSTEM FOR A ROBOTIC STATION

TECHNICAL FIELD

This invention relates generally to robotic stations and in particular to a vision systems for guiding a robotic manipulator.

BACKGROUND

In today's manufacturing environment, robotic stations play a significant role in reducing costs and increasing the quality of manufactured products. As the complexity of manufactured products increases, so does the need for accuracy and repeatability in part placement. Generally, robotic stations utilize vision systems which provide necessary feedback for achieving the required accuracy and repeatability. The robotic stations include a robotic controller that processes image information provided by the vision system for controlling the movements of a robotic manipulator with a work envelope.

The robotic manipulator utilizes a gripper for capturing an object and placing it on a designated surface. A conventional vision system comprises a moving camera and a fixed camera including associated lighting and lenses. The moving camera is mounted on the robotic manipulator for locating the coordinates of the desired surface. The fixed camera through an image deflector captures the images of the object held by the gripper. The image deflector comprises a 45 degree angled mirror which deflects the image of the object held by the gripper to the fixed camera. The image information from the moving camera and the fixed camera provide the information required to align and place the object on appropriate places on the surface.

However, it is desired to eliminate one of the two cameras used in the typical vision system. This, in addition to reducing the cost of the vision system, greatly simplifies interfacing of the vision system with the robotic manipulator.

SUMMARY OF THE INVENTION

Accordingly, it is the object of the present invention to provide a vision system for a robotic station which utilizes a single camera.

According to the invention, the robotic station includes a robotic manipulator which is movable within a predetermined work envelope. The robotic manipulator includes means for capturing an object. A camera is mounted on the robotic manipulator for locating the position of the object. A mirror assembly is positioned such that the image of the object is deflected and captured by the camera.

DETAILED DESCRIPTION OF THE PREFERRED EMBODIMENT

Figure 1:
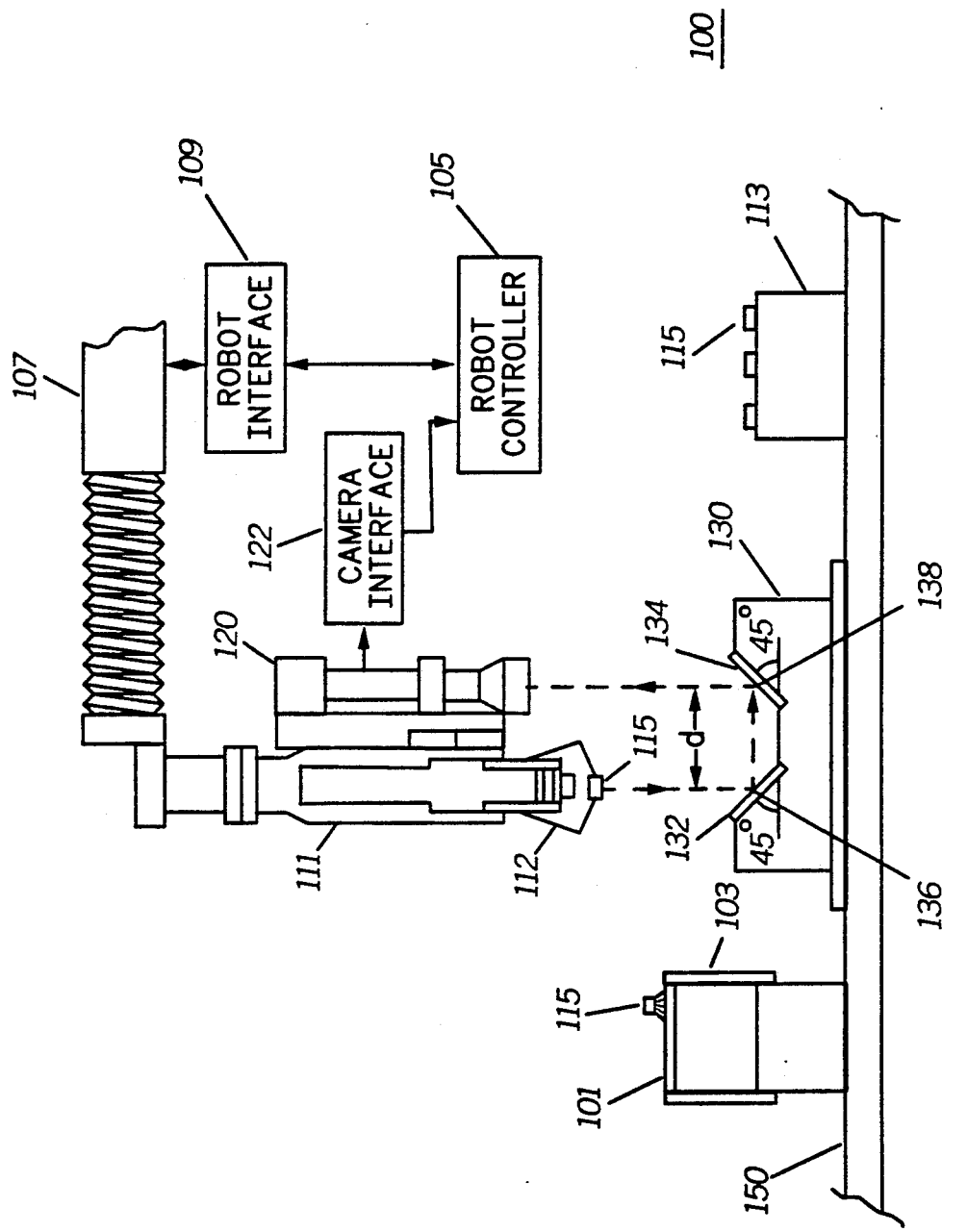
FIG. 1 illustrates a cross-sectional view of the robotic station in accordance with the present invention.

Referring to FIG. 1, the cross-sectional view of a robotic station incorporating the principles of the present invention can be seen as generally depicted by the numeral 100. The robotic station 100 may be utilized in a variety of manufacturing assembly applications to place an object on a predetermined surface area. The robotic station 100 is arranged to cover a predetermined work envelope which includes the assembly area and the area which allows access to the objects to be placed. In the preferred embodiment of the invention, the robotic station 100 is utilized for populating a circuit board 101 with objects which comprise electrical components. The circuit board 101 is carried on a conveyor which also carries other circuit boards to be populated by the robotic station 100. The circuit board 101 is populated by placing electrical components 115 on predetermined areas. In the preferred embodiment, the electrical components 115 comprise leadless components, such as resistors and integrated circuits (IC).

The robotic station 100 operates under the control of a known robot controller 105. The robot controller 105 controls the movements of a robotic manipulator 107 through a well-known robot interface 109. The robotic manipulator 107 includes a gripper 111 for holding the components 115 to be placed on the circuit board 101. The gripper 111 may hold the components by any appropriate mechanism, such as holding fingers 112. Other well-known mechanisms for holding the components include a vacuum tool which allows the gripper to hold the component through a sucking mechanism. The component 115 is picked by the gripper 111 from a tray 113 for placement on the circuit board 101. Other components which are to be placed on the circuit board 101 are contained in similar trays within the work envelope. Once all the necessary components are placed on the circuit board 101, the conveyor 103 provides the next circuit board to be populated.

It is well known that the circuit board 101 when positioned on the conveyor may be oriented in any arbitrary position. In order to accurately place the component 115 on a predetermined area of the circuit board 101, the coordinates of the circuit board 101 and the component 115 with respect to a reference must be determined. The coordinates of the circuit board 101 and the components 115 are provided by converting video pixel data from a camera 120 to cartesian coordinate data which is applied to the robot interface 109 for movement of the robotic manipulator 107. The camera 120, which is mounted on the robotic manipulator 107, is moved directly above the circuit board 101 such that the circuit board image is captured within view field of the camera 120. The camera 120 captures the image of the circuit board 101 and via a well-known camera interface 122, provides the pixel data to the robotic controller 105 for processing. The circuit board 101 includes on its surface prepositioned fiducial marks (not shown). The position of the fiducial marks are captured by the camera 120. The robotic controller 105 accurately determines the orientation of the circuit board 101 based on the position of the fiducial marks. Once the orientation of the circuit board 101 is determined, the robotic controller 105 may also calculate the coordinate of any area on which an electrical component is to be placed.

When a component is picked by the gripper 111, the component 115 may also be in an arbitrary orientation. For accurate placement of the component 115 on the circuit board 101, the orientation of the component 115 as held by the gripper 111 must also be determined. According to the invention, the image of the component 115 as held by the gripper 111 is deflected by a mirror assembly 130. The deflected image is captured by the camera 120 which locates the component 115 and transmits the corresponding pixel data to the robotic controller 105. The mirror assembly 130 comprises two angled mirrors 132 and 134 which are positioned on a reference plane 150 in a face-to-face arrangement. In the preferred embodiment of the invention, the mirrors 132 and 134 comprise 45 degrees angled mirrors and are positioned such that an optical path directed perpendicularly downward to center point (136) of one mirror, e.g. mirror 132, is reflected to center point (138) of the other mirror, e.g. mirror 134. The other mirror then deflects the image perpendicularly upward. The deflected image of the component 115 is then captured by the camera 120. The center points 136 and 138 are positioned at a distance (d) which corresponds to the distance between a reference point 122 on the gripper 111 and a deflection point on the view field of the camera 120. The vision system of the robot station 100 may be calibrated to establish the relationship between the video pixel data used provided by the camera 120 and the cartesian coordinate system used by the robotic manipulator 107. Well-known software algorithm may be programmed to be executed by the robot controller 105 to achieve the calibration of the vision system. One of ordinary skill in the art appreciates that the distance (d) and the angles of the mirrors 132 and 134 may be varied to accommodate various camera, space and general system configuration. The calibration program may also be written to accommodate for the variations in these parameters.

Operationally, the robot manipulator 107 positions the component 115 directly above the mirror 132. The image of the component 115 in any arbitrary position is deflected by the mirror assembly 130 and is captured within the view field of the camera 120. The pixel data provided by the camera 120 are applied through the camera interface 122 to the robot controller 105. The robotic controller 105, after processing the provided data, determines the cartesian coordinates of the component 115. The robotic manipulator 117 and accordingly the gripper 111 are then aligned by the controller 105 to accurately place the component 115 on the desired area of the circuit board 101.

As described, the vision system of the robotic station 100 utilizes a single camera to determine the location of the circuit board 101 as well as the position of the component 115 as held by the gripper 111. Accordingly, the arrangement of the present invention reduces the cost of the vision system and greatly simplifies the calibration and maintenance of the robotic station.

What is claimed is:

1. A robotic station, comprising:
a movable robotic manipulator for picking and placing an object, said movable robotic manipulator including means for holding the object;
a fixed mirror assembly located adjacent to said movable robotic manipulator such that said robotic manipulator is movable relative to said mirror assembly, said mirror assembly comprising a first mirror and a second mirror;
said first mirror for reflecting an image of the object as held by the movable robotic manipulator;
said second mirror for deflecting the image reflected by the first mirror;
a camera fixed to the movable robotic manipulator for capturing an image deflected by the second mirror and for providing corresponding image data; and
a robotic controller for processing the image data to determine coordinates of the object.

2. The robotic station of claim 1, wherein the first mirror and the second mirror are positioned at a 45 degree angle with respect to a reference plane such that a substantially downward optical path is deflected substantially upward by the second mirror.

* * * * *

UNITED STATES PATENT AND TRADEMARK OFFICE
CERTIFICATE OF CORRECTION

PATENT NO. : 5,096,353
DATED : March 17, 1992
INVENTOR(S) : Tesh et al

It is certified that error appears in the above-indentified patent and that said Letters Patent is hereby corrected as shown below:

On the title page, Item [75]: Inventor, add --Jerrold S. Pine, Boca Raton, Florida--

Column 3, line 4, delete "degrees" and insert therfor --degree--

Signed and Sealed this

Nineteenth Day of April, 1994

Attest:

BRUCE LEHMAN

*Attesting Officer*     *Commissioner of Patents and Trademarks*